United States Patent [19]

Spyridakis et al.

[11] 3,962,910

[45] June 15, 1976

[54] METHOD AND APPARATUS FOR FASTENER TENSION INSPECTION

[75] Inventors: Emanuel G. Spyridakis, Sayre, Pa.; Edwin E. Rice, Ann Arbor; Robert J. Seccombe, Detroit, both of Mich.

[73] Assignee: Ingersoll-Rand Company, Woodcliff Lake, N.J.

[22] Filed: Aug. 20, 1973

[21] Appl. No.: 389,704

[52] U.S. Cl. .................................. 73/88 F; 73/139

[51] Int. Cl.² .................................. G01L 5/24

[58] Field of Search ................ 73/139, 88 F; 173/12

[56] References Cited

UNITED STATES PATENTS

| | | | |
|---|---|---|---|
| 1,985,916 | 1/1935 | Coates et al. | 73/139 X |
| 2,756,622 | 7/1956 | LaBelle | 73/139 X |
| 3,368,396 | 2/1968 | Van Burkleo et al. | 73/139 |
| 3,440,869 | 4/1969 | Hardiman | 73/133 R UX |
| 3,606,664 | 9/1971 | Weiner | 73/139 X |
| 3,643,501 | 2/1972 | Pauley | 73/88 F UX |
| 3,693,726 | 9/1972 | Hornig et al. | 73/139 X |
| 3,745,820 | 7/1973 | Weiner | 73/139 |

*Primary Examiner*—Charles A. Ruehl
*Attorney, Agent, or Firm*—Walter C. Vliet

[57] ABSTRACT

A fastener tension inspection system for use with torque producing power tools such as nut runners, screwdrivers, or the like. The inspection system includes a means for measuring torque or other tension proportional function applied to a fastener and a means for measuring at least one additional parameter associated with fastener tightening; for example, time or rotation. With appropriate electronic circuitry, the torquing cycle is started by freerunning the fastener and bringing it up to a predetermined low level of torque sufficient to seat the fastener. Upon reaching the predetermined low level of torque, the means for measuring the additional parameter is initiated and continues until final torquing is completed. The predetermined minimum torque level on the fastener must be reached and a predetermined maximum torque level not exceeded within a predetermined range of the additional parameter or the fastener is rejected. The system is capable of detecting such common fastener defects as insufficient final torque, cross-threading, defective threads or thread stripping.

2 Claims, 4 Drawing Figures

METHOD AND APPARATUS FOR FASTENER TENSION INSPECTION

BACKGROUND OF THE INVENTION

Accurate control over the torque applied to threaded fasteners of machinery is of increasing importance in assembly operations. Various devices have been utilized in fastener tightening power tools to shut off the power supply or disengage the tool from the fastener at a predetermined torque output. Some of the more common devices have been torque responsive clutches, pressure-sensing devices which detect a change in inlet or exhaust pressures of the drive motor and rotating spring devices which are activated by reaction to the output torque.

A limitation of these devices, in addition to their inaccuracy and nonrepeatability, is their inability to detect the common fastener failings; for example, cross-threading, thread stripping, chips in the thread-hole, defective threads or tool malfunction.

Several methods have been developed which improve torquing accuracy such as the so-called "turn of the nut" or "constant energy application" methods. However, none of these methods has suggested a means for detecting the common fastener faults noted above.

SUMMARY OF INVENTION

The present invention provides a torque control and inspection system for power tools which directly senses the torque or another tension proportional function transmitted to a fastener and at least one additional parameter associated with the fastener and compares them to pre-established standards. The simultaneous comparison produces a unique inspection and control system capable of detecting common fastener faults and applying an accurate final torque to the fastener.

The object of the invention is to teach a means for combining a tension-related function applied to a fastener with additional functions of the fastener-tightening process such as elapsed time or fastener rotation to produce a unique, simple and reliable fastener inspection system.

A further object is to teach a device simple to use having both comparative and go-no-go capability independent of operator skill.

In general, these objects are met in a torque control and inspection system for power tools comprising: a power wrench for tightening a fastener; means for measuring a tension related function placed on the fastener by said wrench; means for detecting a predetermined low level of said tension-related function and creating a signal in response thereto; means for receiving said signal and thereupon starting to measure another function other than said tension-related function associated with the continued tightening of the fastener; means for continuously receiving the measurement of said tension-related function on the fastener and the measurement of said another function of said fastener and comparing the measurements to determine if the tension-related function reaches a predetermined magnitude within a predetermined range of the measurement of said another function to detect whether the threaded fastening is defective.

DESCRIPTION OF PREFERRED EMBODIMENT

Figure 1:
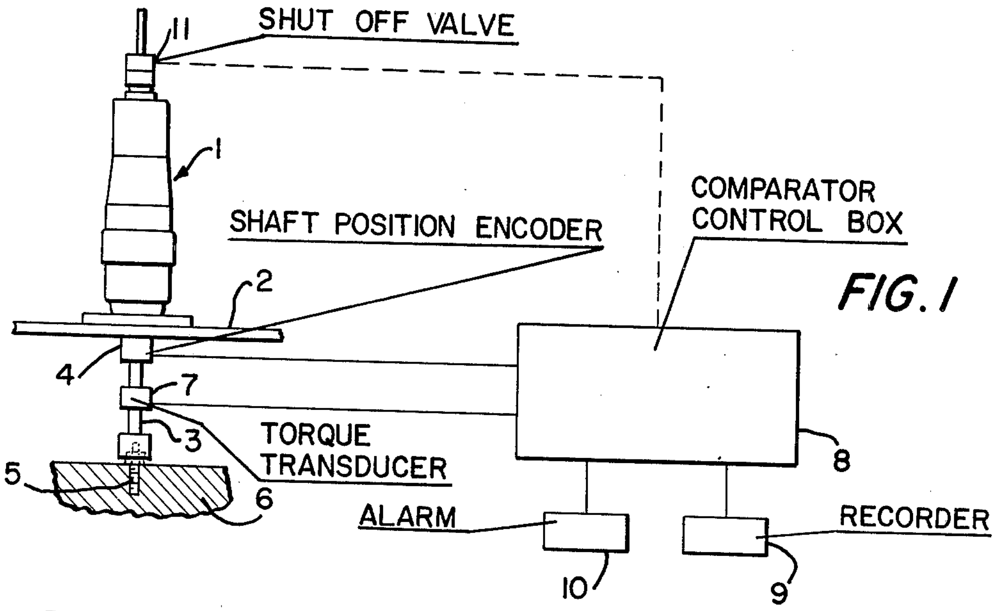
FIG. 1 is a schematic of the torque control and inspection system of this invention.

Referring to FIG. 1, a conventional torque-producing air power tool is shown and generally designated as 1. The tool is mounted on a tool holder 2 and arranged to drive fastener 5 into workpiece 6. The tool 1 has its output on spindle 3. The torque output of tool 1 on spindle 3 is measured by reaction torque transducer 7 which may be of the four arm strain gauge bridge type. For purpose of the preferred embodiment shown, the rotation of spindle 3 is measured by shaft position encoder 4 which may be of the optical angular encoder type utilizing a photo cell to produce a signal pulse. Output of both the torque transducer 7 and the shaft position encoder 4 are fed to the comparator control box 8 which includes instrument type amplifier circuits for both the transducer and shaft position encoder, peak signal detectors, peak hold circuit, dual comparator, a torque limit reference voltage generator (high and low limit voltage) three decade digital counter and other appropriate electrical analog circuitry according to the functions to be performed as described below and which is well known in the analog and tool control arts. A recorder 9 is provided to have a record of the tightening process and an alarm system 10 signals defects outside of the prescribed limits. A fast response shut off valve 11 is interposed in the air supply line to the power tool.

In operation, the power tool 1 is utilized in various conventional ways to start the fastener and run it down to a predetermined low torque set level which typically would be 20 to 25% of the expected final torque. This torque level is sufficient to reliably seat a normal fastener. Upon reaching the low level torque point, the shaft position encoder 4 is activated. The angular position of the spindle 3 is recorded electrically and further angular rotation of the spindle 3 is measured. The fastener is then rotated through a predetermined number of degrees. An air shut-off valve 11 is energized as the power tool 1 approaches the final set angular position and shuts off the air supply of the motor stopping rotation of the fastener. For practical purposes, rotation after initial tightening is proportional to the stretch of the fastener. Tension on the fastener therefore is controlled by stretching the fastener a controlled amount during the final rotation.

As the fastener is being tightened, the applied torque to the fastener is being continuously monitored by the torque transducer 7 placed between the power tool motor and the output spindle. A normal fastener will reach the minimum prescribed torque within a certain prescribed range of rotation once seated. Further, a normal fastener will not exceed a maximum prescribed torque within the prescribed range. (See FIG. 2.)

For example, assume a normal fastener will seat with an initial run down to 20 ft. lb. of torque and that the final acceptable torque in the range of 55 to 65 ft. lbs. will be achieved between 110° and 130° of additional rotation. The initial set points of 20 ft. lbs. and 120° of rotation (middle of the range) plus the acceptable range of final torque (55 to 65 ft. lbs.) and rotation (110° to 130°) are entered in the comparator control box 8.

The fastener is positioned and run down to the initial low level torque of 20 ft. lbs. in the usual manner. Upon reaching 20 ft. lbs., the shaft position encoder 4 is activated by suitable electronic circuiting and the fastener is rotated for 120° less the rotation required for reaction of the power tool 1 shut off mechanism at which point the shut off mechanism is activated. The torque output of the power tool 1 is continuously monitored to determine if the 55 ft. lbs. level is obtained between 110° and 130° of rotation after the low level torque triggering point. The peak torque from the reaction torque transducer 7 is also monitored to be sure the 65 ft. lbs. maximum limit is not exceeded.

Signal means are provided to indicate if the maximum torque has been exceeded, the minimum torque not achieved, the maximum number of turns exceeded or the minimum number of turns not achieved. In addition, the final torque is displayed on recorder 9 which may form a record of fastener tightening. Rotation trigger points may be superimposed on this display if desired.

Figure 3:
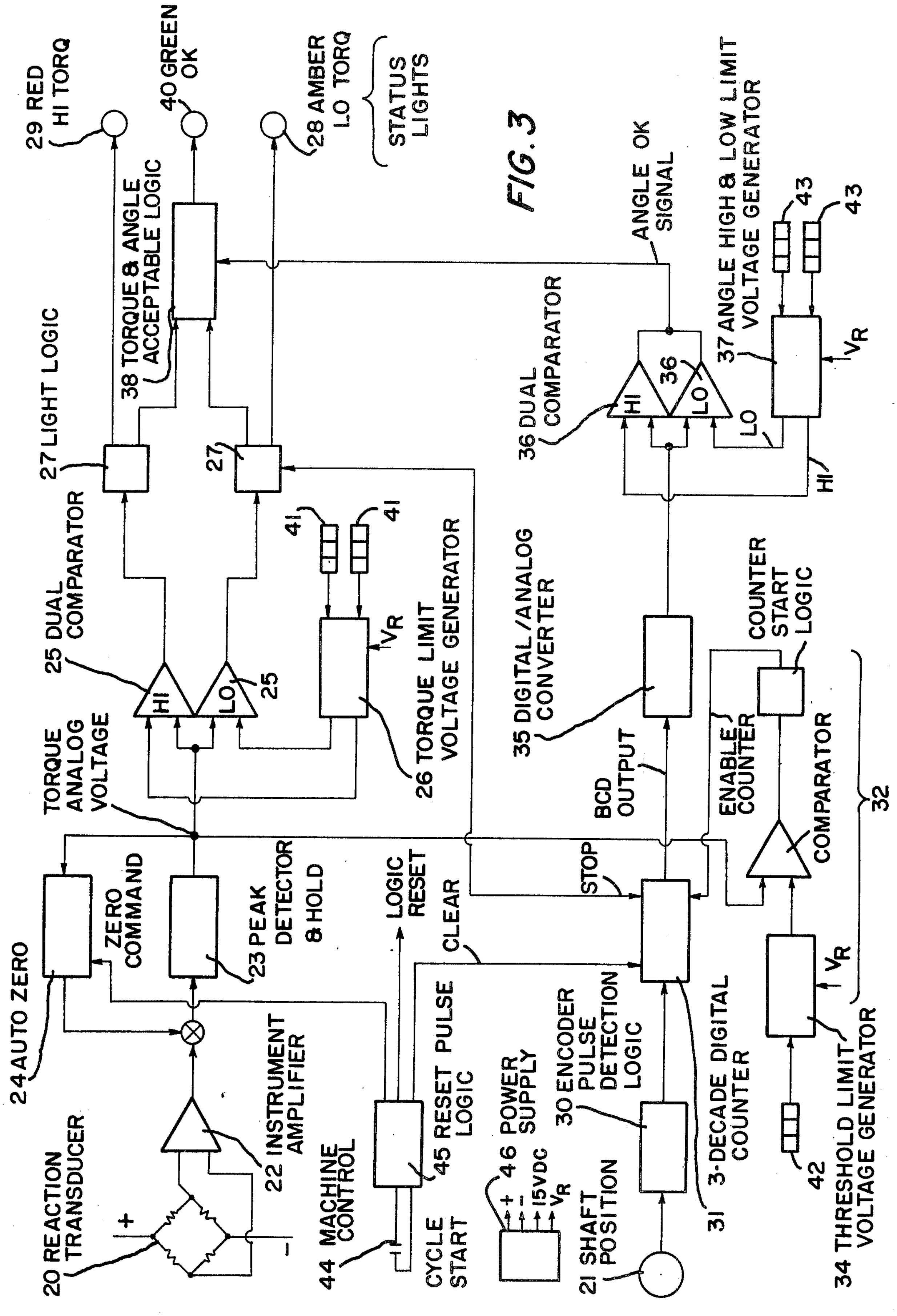
FIG. 3 further details the schematic of FIG. 1 showing the analog components necessary to accomplish this invention for the functions of torque and rotation.

By way of further explanation of the above described equipment FIG. 3 shows in detail the analog apparatus required to accomplish the functions described and attributed to the reaction torque transducer 7, the shaft position encoder 4, and the comparator control box 8. The following description refers to FIG. 3 and describes in conjunction with the labeled block schematic the component functions for the prefered embodiment.

A reaction type, four arm strain gauge bridge, transducer 20 provides torque information to the system. An optical angular encoder 21 provides rotation information to the system.

The transducer signal is fed into an instrumentation type amplifier circuit 22 which includes appropriate filtering, and provides gain. The signal is then fed into a peak detector 23. This circuit detects only positive excursions of signal voltage and holds the highest positive signal obtained. Around this circuit is a zero correction circuit 24 which, when commanded, measures the output of the peak/hold circuit and injects the correct voltage to its input to cause the peak/hold circuit to go to zero. It continues to inject the correction voltage until the circuit is commanded to zero again. The output of the peak/hold circuit is scaled such that the output voltage is equal to 4.00 VDC at the transducers full scale output. This is the primary torque analog signal used for the following circuits:

Inspection of the applied torque is accomplished by the dual comparator 25, torque limit reference voltage generator 26, and the high and low limit light logic 27. The torque limit voltage is derived from a precision reference supply as determined by the torque limit selection switches 41. These two voltages (one for high limit and one for low limit) are applied to the dual analog comparator. As the torque signal rises and passes the low limit the low comparator switches high and thru the low light logic commands the low torque light 28 to go out. The high comparator output remains low unless the high torque limit is passed. If high torque is applied, the red high torque light 29 is commanded on.

The Angular encoder and associated circuitry measures degrees of rotation after a threshold torque is applied. The encoder output is decoded into one pulse per degree of rotation by the encoder pulse detection logic 30. This signal is fed into a three decade digital counter 31. This circuit counts the number of pulses received and provides a binary coded (BCD) output corresponding to degrees of rotation. The counter will handle 0° to 999° of rotation. The counter is not activated until the threshold torque is sensed. Threshold torque signal is obtained from an analog comparator circuit fed by the torque analog signal and a limit reference voltage 33. The limit voltage is derived from a reference supply 34 in the same manner as described above for torque inspection. Threshold torque limit selection switch 42 determines the limit voltage supplied by the threshold limit voltage generators. The counter output is fed to a digital analog converter 35 which provides an analog output proportional to degrees of rotation. This signal is fed to a dual analog comparator 36. The limits to the comparator are derived from a precision reference supply 37 as described above. The limits are set by means of torque turn angle selection switches 43 as a window around the low torque limit. The counter is stopped when low limit is reached.

Figure 2:
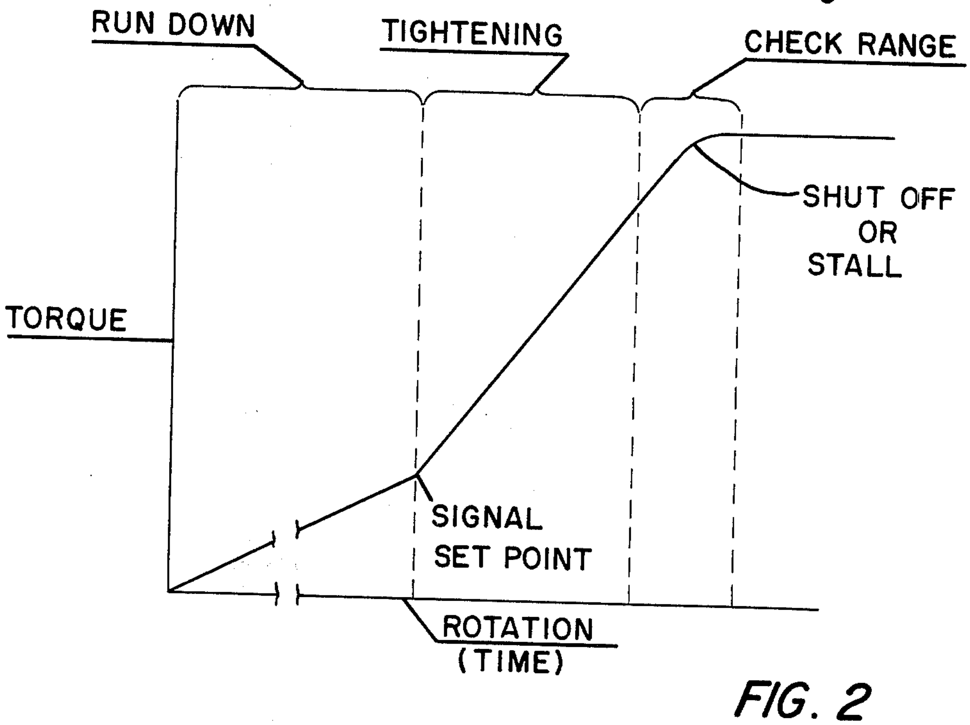
FIG. 2 is a graph representing torque versus rotation.

From FIG. 2 it is seen that the low limit torque value must be attained within a specified angular window.

If the above angular rotation and torque applied is within the set limits, the torque and angular acceptance logic 38 will command the green OK light 40 to "on". If the amber low torque and the red high torque lights are both off and the green light "OK" is not received, the indication is that the correct torque was achieved, but angular rotation was not within limit. Cycle command start and reset and machine control 44 are accomplished by the reset pulse logic module 45. The transducer bridge voltage, system operating voltage (15 VDC) and precision reference voltage VR are supplied by the power supply 46.

It should be obvious to one skilled in the art that similar circuitry may be utilized to perform the present invention with torque as the first tension related function and time as the second tension related function.

Figure 4:
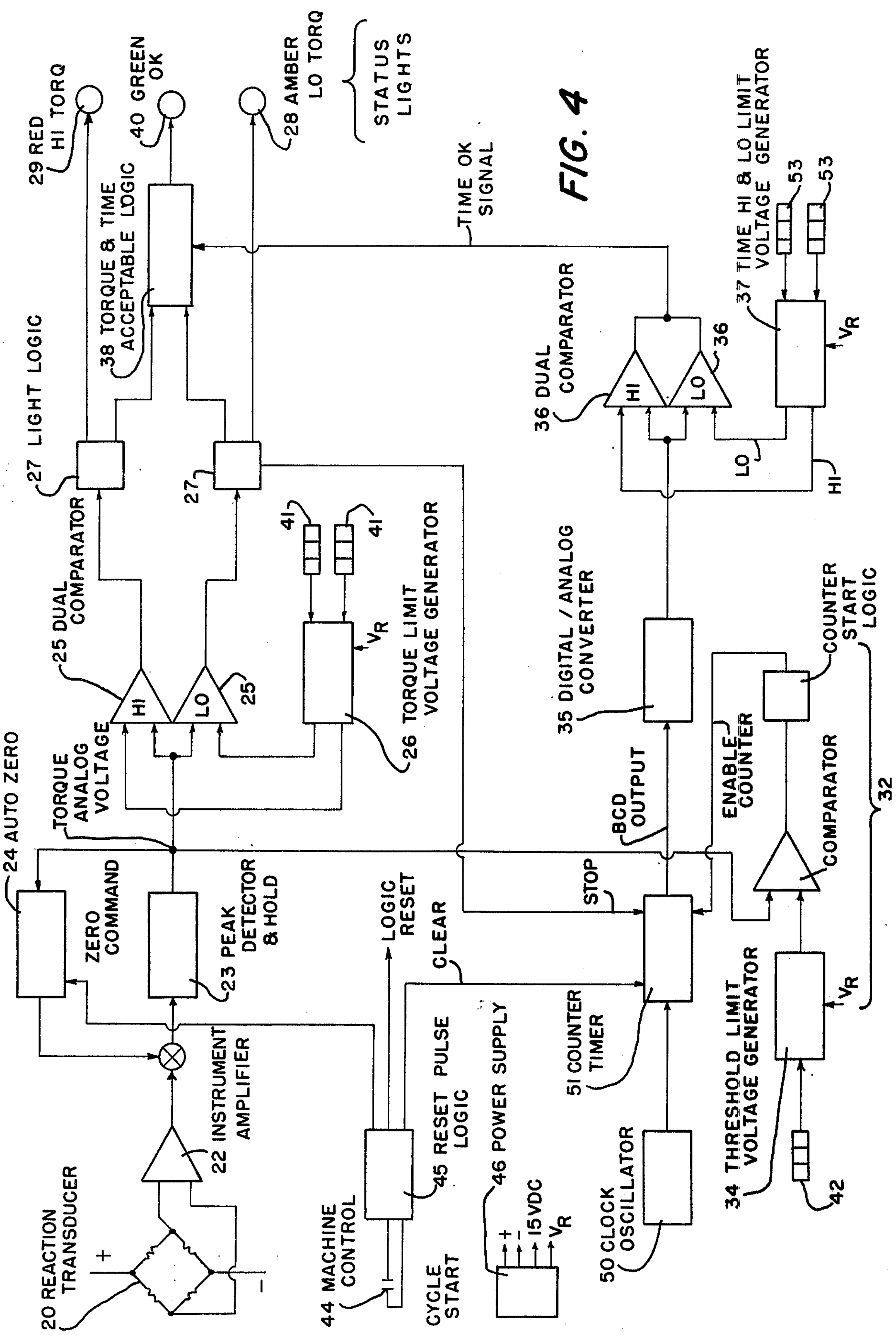
FIG. 4 further details the schematic of FIG. 1 showing the analog components necessary to accomplish this invention for the functions of torque and time.

FIG. 4 shows in detail the apparatus required to accomplish this embodiment. The system is similar to the embodiment shown for the function of torque and rotation and where the apparatus is the same and functions the same, the same reference numbers are utilized. The basic difference is that a clock oscillator 50 and a counter timer 51 are essentially substituted for the shaft position encoder 21 (FIG. 2), 4 (FIG. 1), the pulse detection logic 30, and the three decade digital counter 31. The torque measuring and control circuit is described above. The time monitor circuit operates as follows: The time required to reach the acceptable low torque limit is measured after a threshold torque is reached. The output of an accurate clock oscillator 50 with a period of 1 millisecond is fed to a 3-stage (0–999 milliseconds) decade digital counter timer 51. The output of the counter is binary coded and is fed into a digital to analog converter 35. The counter 51 is started when the threshold torque is sensed. Threshold torque signal is obtained from an analog comparator circuit 32 fed by the torque analog signal and a limit reference voltage. The limit reference voltage is derived from a reference supply 34 in the same manner as described above for torque inspection. The digital to analog converter output is an analog signal proportional to the number of milliseconds past the threshold torque. This signal is fed to a dual analog comparator 36. The limits to the comparator are derived from a precision reference supply 37 as described above. The time limits are set by means of two selection switches 53 (milliseconds) as a window around the low limit. The counter is stopped when the low limit is reached. As can be seen from FIG. 2 that the low limit torque valve must be attained within a specified time window. If the above time and torque applied is within the set limits, the torque and time acceptable logic 38 will command the green OK light to "on." If the amber low torque light and the red high torque light are both off and the green "OK" light is not received, the indication is that the correct torque was applied, but not within the specified time limits. The remainder of the apparatus operates as described above for the functions of torque and rotation. It should be obvious to one skilled in the art that the clock oscillator 50 and the counter timer 51 may be located in the comparator control box 8 of FIG. 1 and that the angular position encoder 4 is unnecessary, its function being generally accomplished by the clock oscillator 51.

Of course both time and rotation measurements may be simultaneously utilized as a second tension related function to provide a system check as later described.

With the above apparatus and method, fastener joints appearing "softer" than normal (lower torsional build-up rate) would be rejected because the minimum torque would not be achieved within the prescribed rotation. Poor threads, damaged threads, dirty threads, lack of lubrication, crossed threads and partially stripped threads are common defects that would create an early low level torque initiation whereby the final torque would not reach the minimum prescribed torque within the prescribed rotation. In a gasketed joint, a softer than normal gasket would also initiate early in relation to the number of turns required for satisfactory final torque. On the other hand, a bottomed fastener, severe cross-threading, missing lock washer or a harder than normal or missing gasket are some examples of defects that will produce a late initiation and cause the maximum torque to be exceeded within the prescribed limits of rotation.

As an alternative to providing a shut off means in response to a prescribed rotation, it is possible to set the power tool output to stall at the maximum applied torque desired. In this case, joints "harder" than normal (higher torsional build-up rate) may be detected by monitoring the stall point (rotation stop) and determining that it falls within the prescribed range of rotation or time. "Softer" than normal joints will not stall the power tool within the prescribed range.

Another alternative is to include integrating circuitry in the comparator control box for the measurement of the tension-related parameter to detect the point at which the bolt begins to yield; for example, when the increase in torque is no longer proportional to the increase in rotation. The power tool would be shut off in response to the yield point detection. The shut off would occur within a predetermined range of the second parameter chosen and serve as an inspection method as outlined above. The method of detecting bolt yield point was described in a Patent issued to R. W. Pauley (U.S. Pat. No. 3,643,501) dated Feb. 22, 1972. We have suggested here the use of that method along with suitable circuitry to initiate the determination, detect the yield point and shut off the power tool as a tension-related function in our invention. In this case, torque and the rate in change of torque serve as a plurality of tension-related functions to initiate the measurement of the second parameter and shut off the power tool.

Although we have chosen torque as the first parameter for measurement in the preferred embodiment, other parameters capable of measurement and having a direct relationship to fastener tension may be used, such as bolt elongation, bolt strain, or washer compression to initiate the comparison cycle and serve as a range reference. A plurality of tension-related functions such as torque and bolt strain may be utilized to perform the functions of the first parameter.

Although we have chosen rotation as the second parameter for measurement in the preferred embodiment, other parameters such as time or a combination of time and rotation will also provide a reliable inspection system and in certain cases may be more desirable. For instance, in a given system the prescribed rotation will occur within a prescribed time for a normal fastener. Time is easier to measure and may be useful where a more compact system is desired at the power tool location. "The timer may be located in the comparator control box." A combination of parameters provides additional reliability and a cross check of both fastener and power tool performance. For example, if the prescribed final torque occurs within the prescribed rotation but not within a prescribed time, it could indicate such things as tool malfunction or low air pressure. An integrated function of any suitable parameter may also be utilized for the first or second parameter as indicated above in the yield point example. In the preferred embodiment numerous components such as the shaft position encoder 4, torque transducer 7, recorder 9 and comparator control box 8 have been described by functions. The selection of these components is well known by those skilled in the art of electronic or pneumatic tool control. A designer may select suitable components to perform the functions involved from the electronic or pneumatic fields with satisfactory results.

Although the preferred embodiment of the invention has been shown and described, and several others suggested, it should be understood that the invention is not limited thereto, except by the scope of the claims. Various modifications and changes can be made without departing from the scope and spirit of the invention as the same will now be understood by those skilled in the art.

We claim:

1. Apparatus for fastener tension inspection comprising:

a power wrench for tightening a fastener;

means for measuring the torque placed on the fastener by said wrench;

means for detecting a predetermined low level of initial torque and creating a signal in response thereto;

means for receiving said signal and in response thereto starting to measure the time associated with the continued tightening of the fastener;

means for continuously receiving the torque load on the fastener and the measurement of said time and comparing the measurements to determine if the torque reaches a predetermined magnitude within a predetermined range of time to detect whether a fastening unit is defective.

2. A method for fastener tension inspection comprising:

rotating a fastener by power wrench means;

measuring at least one tension-related function placed on the fastener by rotation of said wrench means;

detecting a predetermined low level of said at least one tension-related function and creating a signal in response thereto:

receiving said signal and in response thereto measuring at least another function associated with the continued tightening of the fastener;

receiving the measurement of said at least one tension-related function on the fastener and the measurement of said at least another function of said fastener and comparing the measurements to determine if said at least one tension-related function reaches a predetermined magnitude within a predetermined range of the measurement of said at least another function to detect whether a fastening unit is defective; said another function is elapsed time.

* * * * *